United States Patent Office 3,783,127
Patented Jan. 1, 1974

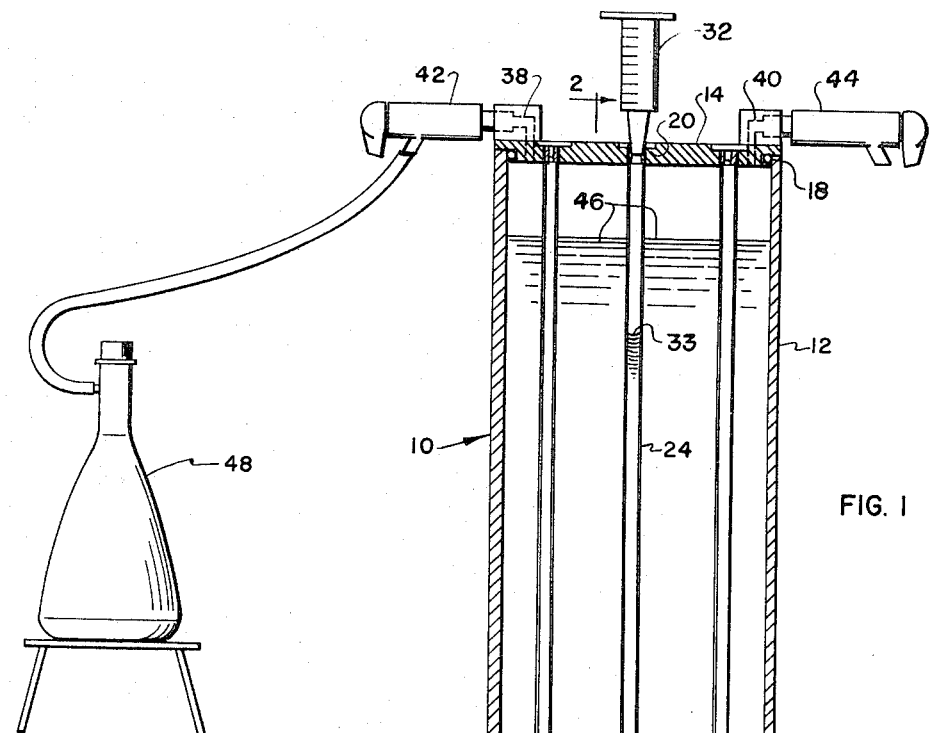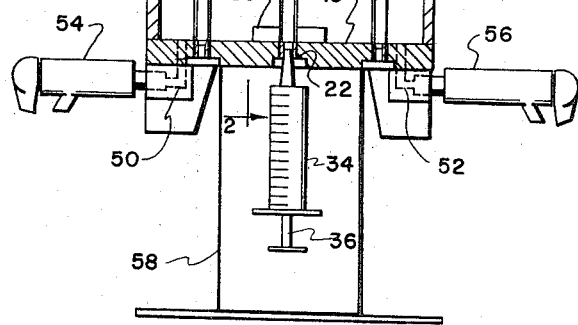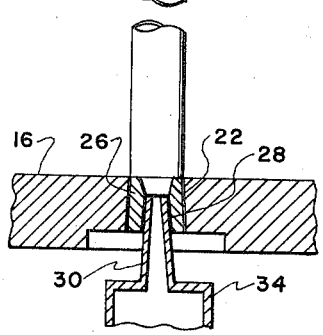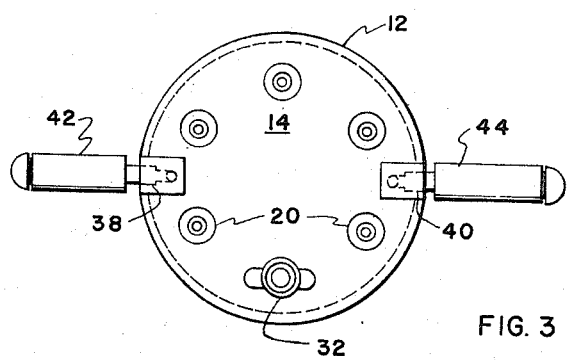

3,783,127
COMBINATION CONCENTRATOR-DIALYZER DEVICE
Melvin W. Cook, 5118 SW. Scholls Ferry Road, Portland, Oreg. 97225, and Donald E. Begley, Hillsboro, Oreg.; said Begley assignor to said Cook
Filed July 2, 1971, Ser. No. 159,292
Int. Cl. B01d 13/00, 31/00
U.S. Cl. 210—22                                    10 Claims

ABSTRACT OF THE DISCLOSURE

A laboratory method and device for simultaneously concentrating and dialyzing, through the same semipermeable membrane, a sample of macromolecules such as a protein solution. The device comprises an air-tight vertical cylindrical housing having a plurality of semipermeable membrane tubes stretched vertically inside the housing between its top and bottom end walls. The open ends of each tube are sealingly fastened to the end walls of the housing and communicate with the exterior thereof through apertures, so as to expose the interior of each tube to the atmosphere while sealing it from the remainder of the cylindrical housing. The aperture at the bottom of each tube is adaptable to receive a syringe for automatically predetermining the minimum volume to which the sample will be concentrated. The interior of the cylindrical housing comprises a dialysate compartment filled with a suitable liquid which engulfs the exterior of the membrane tubes. The liquid is initially subjected to subatmospheric pressure by the application of suction from a primary source of vacuum such as a vacuum pump or water aspirator communicating with the interior of the housing. After the initial application of suction, the liquid can be maintained at subatmospheric pressure by coupling the housing with a vacuum reservoir, and the primary source of vacuum can be disconnected from the housing. Upon the insertion of a sample into a membrane tube, both dialysis and concentration of the sample occur simultaneously through the semipermeable membrane tube.

BACKGROUND OF THE INVENTION

This invention relates to a device for use primarily in laboratories for concentrating and dialyzing a sample of macromolecules, such as a protein solution, in order to prepare the sample for isolation, purification, or characterization procedures. More specifically the device is of a novel type which performs the two functions of concentration and dialysis simultaneously through the same semipermeable membrane by the application of suction in conjunction with an appropriate liquid on the side of the membrane opposite the sample.

At present, it is common practice to perform the two procedures of concentration and dialysis of a particular sample in separate steps. To perform the concentration procedure, a dilute sample is fed into a tube of semipermeable membrane material, the exterior of which is evacuated and held under subatmospheric pressure by continuous coupling with a primary source of vacuum such as a vacuum pump or water aspirator. The pressure within the membrane tube is atmospheric, and therefore the suction applied to the exterior of the tube draws the low molecular weight permeable substances, such as water and water-mixed salts, out of the sample through the membrane. This leaves behind a concentrated mass of higher molecular weight impermeable substances, such as proteins. These impermeable substances in the sample, regardless of their chemical composition, are referred to for convenience throughout this application and particularly in the claims as "macromolecules." As can be readily appreciated, the concentration step comprises a simple filtering process generated by the pressure differential across the membrane. A similar result may be obtained by maintaining a superatmospheric pressure on the sample inside the membrane tube and exposing the exterior of the tube to atmospheric pressure. The use of superatmospheric pressure on the sample may not be particularly desirable however, since it may adversely affect certain substances, such as proteins, in the sample.

Once the sample is sufficiently concentrated it may also be necessary to reduce the concentration or alter the composition of certain permeable substances, such as salts, present in the sample without substantially diluting the protein concentration of the sample. This second step, by which the concentration of permeable rather than impermeable substances in the sample is altered, is the dialysis step. In this process a liquid is placed outside a semipermeable membrane tube and the sample is placed inside. No suction or pressure differential is applied across the membrane. An exchange of permeable molecules between the sample and the liquid occurs by osmosis until there is a sufficient intermixture such that chemical equilibrium of the permeable substances on both sides of the membrane is achieved.

The performance of the concentration and dialysis procedures in separate steps as described above and presently practiced in the art is both time-consuming and laborious. Moreover the step of concentrating the sample by drawing the permeable substances in the sample through the semipermeable membrane into an evacuated chamber requires continuous operation of a vacuum pump, water aspirator, or other primary source of vacuum to achieve a reasonably rapid rate of concentration. Even with a continuous primary source of vacuum, concentration requires an extended period of time to achieve satisfactory results, and it is rather uneconomical to operate a vacuum pump or other primary source of vacuum continuously throughout this period. Unfortunately, the alternative of utilizing a vacuum reservoir instead of a continuous primary vacuum source has, in the past, considerably retarded the concentration process.

Since the performance of both concentration and dialysis usually necessary in preparation for many common chemical and physiological experiments, the excessive amount of time required to perform each procedure separately significantly increases the cost and hinders the completion of important research projects. Moreover, unless a primary source of vacuum is utilized continuously throughout the concentration process, it can be inordinately slow. Accordingly, a great need exists in the chemical and physiological sciences for a process and device which will perform the two procedures of concentration and dialysis of samples in a fraction of the time in order to facilitate analysis and research involving these samples. Moreover the process should not require the continuous operation of a primary source of vacuum to achieve a relatively rapid rate of concentration of the sample.

SUMMARY OF THE PRESENT INVENTION

The present invention is directed to a method and device for simultaneously concentrating and dialyzing a fluid sample of macromolecules in preparation for analysis, experimentation or clinical uses involving the sample. The device comprises a sealed vertical cylindrical housing having a plurality of vertical tubes stretched between its top and bottom end walls. The tube are constructed of a semipermeable membrane material having pores large enough to pass permeable substances of low molecular weight, such as water or salts, but too small to allow the passage of certain impermeable substances of high molecular weight, such as proteins. The open ends of each tube are sealingly fastened to the top and bottom end walls of the housing by apertured collars which taper inwardly toward the interior of the housing and fit tightly inside identically tapered holes in the end walls. A syringe is inserted into the aperture in the bottom collar of the membrane tube to collect the processed sample from the tube, and sample is then introduced into the membrane tube through the aperture in the top collar. Thereafter a syringe without plunger, or other suitable container open to atmospheric pressure, can be inserted into the aperture of the top collar to serve as a sample reservoir. The interior of the housing surrounding the membrane tubes is filled with a suitable liquid which engulfs the exterior of the membrane tubes throughout most of their length. This liquid is initially subjected to subatmospheric pressure by the application of suction to the interior of the housing through a passageway communicating with a primary source of vacuum such as a vacuum pump or water aspirator. After the initial application of suction, the liquid can be maintained at subatmospheric pressure by coupling the housing with a vacuum reservoir.

Upon the introduction of a sample into one or more of the vertical membrane tubes, the two processes of dialysis and concentration of the sample occur simultaneously. In the dialysis process, permeable molecules such as water and salts exchange by osmosis between the sample and the liquid through the semipermeable membrane to chemical equilibrium. In the concentration process, the suction applied to the liquid causes permeable substances such as water and salts to be drawn out of the sample, at a rate much faster than any flow of such substances in the reverse direction caused by osmosis. Since the impermeable molecules, such as proteins, in the sample cannot penetrate the semipermeable membrane, the net expulsion of the permeable substances causes a significant reduction in volume of the sample and thus concentrates the impermeable molecules.

The application of both suction and a liquid at the same time to the exterior of a semipermeable membrane tube to achieve simultaneous concentration and dialysis of a sample produces several significant benefits. First, the performance of the two procedures simultaneously rather than in successive steps obviate the necessity of spending time to perform each step separately. Moreover it has been discovered through experimentation that when the two processes are carried out simultaneously, no continuous primary source of vacuum need be utilized to achieve a rapid rate of concentration. The liquid in the housing exterior of the membrane tubes need simply be coupled to an evacuated flask after initial evacuation of the housing, and satisfactory concentration and dialysis of the sample can be achieved in approximately one-quarter of the time that it would take to concentrate the sample alone by attempting to maintain suction in the housing with an evacuated flask but without any liquid in the housing. In fact, the time necessary to complete both processes together, by means of the present invention, without the need for constant application of a primary source of vacuum, is comparable to the time it would take to concentrate the sample alone using a continuous source of vacuum. The apparent reason why the combination of the two procedures obviates the need for applying a constant source of vacuum to achieve a high rate of concentration is that with a liquid present in the housing, the initial evacuation of the housing removes all gases, such as air, from the liquid and therefore provides the liquid with a high capacity for absorbing those gases present in the permeable substances, such as water, drawn from the sample through the semipermeable membrane tube into the housing during concentration. This absorptive capacity of the liquid ensures that the subatmospheric pressure within the housing is not appreciably diminished during the concentration process. Without a liquid in the evacuated housing, the suction within the housing diminishes significantly as the permeable fluid containing mixed or dissolved gases is drawn through the membrane from the sample into the housing. This reduction in suction greatly prolongs concentration unless a primary source of vacuum is constantly applied to replenish the suction.

In addition to the benefits described above, the speed at which the combined processes occur seems to be enhanced by a synergistic effect apparently resulting from the fact that the salts or other permeable solutes drawn into the liquid from the sample tend to reduce the activity of the water or other solvent molecules in the liquid beyond that caused by the suction alone, thereby combining with the suction to increase the rate at which the permeable fluids such as water are withdrawn from the sample. Also, removal of the permeable solutes from the sample increases the activity of the solvent molecules in the sample, facilitating their passage into the liquid. The increase and reduction of solvent molecule activity referred to herein is a result of the well known principal that the osmotic pressure of a solution is proportional to its concentration of solutes. Thus as the liquid accepts salts or other solutes from the sample and becomes more concentrated, its osmotic pressure and thus its tendency to accept water or other solvents through the semipermeable membrane material increases because its solvent molecule activity decreases. Conversely, as the sample loses solutes and becomes more dilute, its osmotic pressure diminishes and its tendency to expel water or other solvent increases because its solvent molecule activity increases. Other reasons, as yet undertermined, may also exist for the enhanced rate of concentration achieved by combining the two processes of concentration and dialysis.

It has also been discovered through experimentation that the rate of concentration of the sample can be increased by the addition of an impermeable substance, such as high molecular weight dextran, to the dialysate liquid in the housing. This further decreases the activity of solvent molecules in the liquid and thereby further increases the net flow of water or other solvent from the sample to the liquid, thus hastening the concentration of the sample.

In addition to the foregoing primary advantages of the present invention, novel apparatus is provided to facilitate implementation of the combined concentration-dialysis procedure. An important feature of the apparatus is the provision of a dialysate housing surrounding the sample containers in combination with means for imposing a pressure differential between the dialysate liquid and the sample. The dialysate housing permits rapid dialysis simultaneously with concentration and, once placed under subatmospheric pressure, retains its concentrating ability without the need for continued connection with a primary source of vacuum.

In addition, novel and time-saving means are provided for collecting the concentrated and dialyzed sample, together with novel means for economically sealing and fastening the membrane tubes with the dialysate housing.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a side elevation, partially sectional view of an illustrative embodiment of the concentrator-dialyzer device.

FIG. 2 is a partial enlarged detail view taken along line 2—2 of FIG. 1.

FIG. 3 is a top view of the concentrator-dialyzer device.

DESCRIPTION OF THE PREFERRED EMBODIMENT

The dialyzer-concentrator device, designated generally as 10 in FIG. 1, comprises a vertical cylindrical housing 12 having a top end wall 14 and a bottom end wall 16. The housing is constructed of any suitable material, such as transparent acrylic plastic. Top end wall 14 and bottom end wall 16 form airtight seals over the ends of housing 12, the bottom end wall by its adhesion through a bonding agent such as plastic solvent, and the top end wall by virtue of a tight-fitting elastomer O-ring 18. The O-ring 18 facilitates the removal and resealing of top end wall 14 to permit access to the interior of housing 12 for servicing of the device when necessary.

The top end wall 14 contains six equally spaced openings 20 arranged in a circular pattern about the longitudinal axis of cylindrical housing 12. The bottom end wall 16 contains six identically arranged openings 22, each vertically aligned with a respective opening 20 in the top end wall. Stretched between each aligned pair of openings 20, 22, respectively, is a sample container tube 24 constructed of a suitable semipermeable membrane material compatible with the sample being processed. For example in the processing of water-mixed protein samples, cellulose dialyzer tubing No. 4465–A2 sold by Arthur H. Thomas Company of Philadelphia, Pa. is a suitable material since it is permeable to water molecules and other low molecular weight compounds such as salts, and thus permits their passage through the membrane material. On othe other hand the material is impermeable to substances of high molecular weight such as proteins (i.e., substances having molecular weights of approximately 12,000 and higher) and thus prevents their passage. Other permeability and material characteristics may be desirable depending on the sample to be processed.

The interior of each membrane tube 24 is sealed from the interior of housing 12 by mounting means which tightly fasten both ends of the tube within a pair of identically aligned openings 20, 22 respectively. As best seen in FIG. 2, openings 20 and 22 are each tapered slightly toward the interior of housing 12. A collar 26, having an aperture 28 and an exterior surface tapered to identically match the inward taper of openings 20 and 22 respectively, fits within each open end of a tube 24 and seats within opening 20 or 22, as the case may be, sealingly fastening the end of the tube in the opening. The aperture 28 within each collar acts as an exposure port by which the interior of each tube 24 is exposed to the atmosphere outside of housing 12 while the seal effected by the collar prevents exposure of the interior of housing 12 to the atmosphere. All six tubes within housing 12 are fastened and sealed in substantially the same way.

As shown in FIG. 2, aperture 28 of each collar 26 is also tapered inwardly toward the interior of housing 12. The taper of aperture 28 is designed to engage and couple with the tapered nozzle 30 of a syringe such as 32. In FIGS. 1 and 2 of the accompanying drawing two such syringes are shown coupled with a membrane tube 24. The top syringe 32 is used to introduce the sample solution 33, the composition of which will be described later in detail, into the tube 24 and also to act as a sample reservoir. The bottom syringe 34 collects the sample after it has been dialyzed and concentrated. The bottom spyringe is graduated, and its plunger may be adjusted to receive a precise volume of the concentrated sample. This is particularly useful in collection of the sample where the precise amount needed to perform a particular experiment may be collected directly from the device without the need for intermediate measuring and other manipulation of the sample. This would normally be accomplished by adjusting the plunger 36 to the desired volume. When sufficient concentration and dialysis of the sample had occurred, the syringe containing the concentrated sample at the desired volume would be withdrawn.

In addition to openings 20, the top end wall 14 of housing 12 contains two ducts 38 and 40 respectively, each communicating between the exterior and interior of housing 12. These ducts are each coupled with valves 42 and 44 respectively which are of any suitable fluid type such as the "Quick-Seal" valve manufactured by Virtis Company of New Jersey. Ducts 38 and 40, and their respective valves, are used for filling the interior of housing 12 with a suitable liquid 46, the composition of which will be described hereafter in greater detail. In addition either of the ducts, such as duct 38 in FIG. 1, comprises an evacuation passageway by which the interior of housing 12 is subjected to subatmospheric pressure by coupling the duct and its respective valve with a primary source of vacuum. The primary source of vacuum (not shown) may comprise any type of vacuum pump suitable for laboratory use, such as a water aspirator. Once the desired subatmospheric pressure is achieved within housing 12, it is not necessary that the vacuum pump or other source of vacuum be continuously coupled with the housing. Rather it is sufficient that a vacuum reservoir such as flask 48 be coupled with duct 38 to help maintain the vacuum. Obviously one simple way to accomplished this is to initially attach the primary source of vacuum to a port in the stopper of flask 48, and thereby evacuate both the interior of the housing 12 and flask 48 simultaneously. Thereafter the communication between the flask and the primary source of vacuum can be blocked by any suitable valve means such as a hose clamp, thereby maintaining the vacuum in the housing and the flask. The primary source of vacuum can then be disconnected. In addition to acting as a vacuum reservoir, flask 48 performs the function of receiving the overflow from liquid 46 as fluid flows from sample 33 into liquid 46 during the concentration process.

The bottom end wall 16, in addition to openings 22, contains two ducts 50 and 52 respectively for emptying the liquid 46 from housing 12 when required. Ducts 50 and 52 have associated valves 54 and 56 for opening and closing the ducts, and are similar to ducts 38, 40 and valves 42, 44 of top end wall 14 in all respects.

To prepare the concentrator-dialyzer device 10 for operation, the housing 12 is filled with a suitable liquid 46 through valve 44. If a water-mixed protein sample is to be processed, the liquid may comprise only water. Preferably, however, dextran or other suitable substance impermeable with respect to the membrane material of tubes 24, may be dissolved in the water in sufficient strength to appreciably reduce water molecule activity (i.e. increase osmotic pressure) in the liquid 46 and thus enhance concentration of the sample 33. The substance should be impermeable with respect to the membrane material of tubes 24 to prevent its contaminating the sample and reducing water molecule activity within the sample. If it is desired to alter rather than simply dilute the solute composition of the sample solution 33, certain permeable solutes may also be included in the liquid 46. It should be recognized that liquid 46 might in some cases comprise an organic or inorganic solvent other than water, such as alcohol for example, with a suitable impermeable solute to reduce its solvent molecule activity just as the dextran reduces water molecule activity, and perhaps certain permeable solutes for dialysis of the sample. Generally speaking, the identity of the components in liquid 46 depends on the composition of sample 33 and the desired character of the osmotic exchange between the sample 33 and the liquid 46.

The liquid 46 surrounding the semipermeable membrane tubes is continuously stirred by a magnetic stirrer 58 of conventional design over which the housing 12 is placed. A bar magnet 60 rests on the inside of the bottom end wall 16 of the housing 12 and continuously stirs liquid 46 to enhance the rate at which the sample 33 is processed.

After housing 12 has been filled with liquid 46, and valve 44 is closed, a vacuum is applied to the interior of housing 12 through evacuation passageway 38 and valve 42 and maintained in the manner previously described. With the interior of housing 12 and liquid 46 held at subatmospheric pressure, and with syringe 34 inserted in the bottom opening of a tube 24, a fluid sample 33 is introduced into the tube through its top opening from a syringe 32 or from some other source. The plunger is removed from syringe 32 to expose the sample 33 to atmospheric pressure. The sample 33, as introduced into the tube, normally comprises a mass of macromolecules such as proteins impermeable with respect to the membrane tube 24, mixed with a permeable fluid medium such as water. The mixture may or may not technically be classified as a solution, depending upon its composition. As in the case of liquid 46, sample 33 need not necessarily comprise a water-mixed sample, although that would be the most common type encountered in the chemical and physiological sciences. In addition the sample solution may contain one or more other permeable substances, such as salts, in the permeable fluid medium.

Upon introduction of the sample 33 into a tube 24, the two processes of concentration and dialysis occur simultaneously. Using the example of a water-mixed protein sample 33. Due to this initial imbalance, the solute therein, and a liquid 46 comprising water, the dialysis process may involve two different aspects. One of these is the extraction or dilution of permeable salts originally present in the sample, and the other is addition of permeable solutes, such as salts, to the sample. The dilution process occurs because the liquid 46 originally has a much lower or perhaps non-existent concentration of the identical permeable solutes to be extracted from the sample 33. Due to this initial imbalance, the soluble molecules flow by osmosis through the semipermeable membrane wall from the same solution into the liquid dialysate 46, and permeable solvent molecules flow from the dialysate into the sample, in an effort to equalize the solute concentrations of the two liquids. Since the volume of liquid 46 in housing 12 is much greater (preferably, at least 60 times as great) than the volume of the sample in tubes 24, dialysis of the same by osmosis continues until the permeable solute concentration in the sample solution is reduced to approximately 2% of its original strength. If it is desired that certain permeable solutes be added to the sample as well as extracted, the solutes to be added are included in the liquid 46 in a concentration higher than any concentration of the identical solute which may be present in the sample 33, and the reverse of the previously described osmotic process occurs with respect to these solutes.

Since most laboratory procedures require the removal of salts or other permeable solutes from sample solutions in an amount sufficient to reduce their concentration to 2% or less of their original concentration, it is desirable in the design of a concentrator-dialyzer device of the type herein described that the interior volume of housing 12 be 50 or 60 times the combined volume of tubes 24. If the liquid 46 is changed while the sample remains in the device, or if a constant flow of fresh liquid 46 is utilized, a much greater degree of dilution can be achieved with any given size of apparatus housing.

While dialysis is proceeding under the action of osmosis, concentration of the sample 33 is taking place simultaneously. This is due to the fact that the interior of each tube 24 is exposed to the atmosphere through apertures 28 of the top collars 20. The atmospheric pressure within tubes 24, and the subatmospheric pressure within the housing and exterior of the tubes, generates a decreasing pressure gradient from the sample 33 through the wall of the membrane tube 24 into liquid 46. The pressure differential between the sample and the liquid causes molecules in the sample which are permeable with respect to the membrane tube to pass through the membrane and into the dialysate, while the large impermeable molecules, such as proteins, are retained within the tube. This reduces the total volume of sample 33, and increases the concentration of the impermeable molecules in the sample.

Various experiments have been performed using the device of the present invention to determine the difference in rate of sample concentration between simply applying a vacuum without liquid 46 to the exterior of a sample container tube 24 on the one hand, and applying the same vacuum in conjunction with a liquid 46 to the exterior of the tube on the other hand. In all of the experiments a membrane tube 24 having a capacity of 60 ml. was filled with a typical sample of proteins and saline solution.

In the first experiment, no liquid 46 was placed inside housing 12, and an initial subatmospheric pressure of approximately .13 atmosphere was applied to the interior of the housing by a water aspirator. After the initial application of vacuum the interior of the housing was connected to an evacuated flask and the aspirator was disconnected. At the end of one hour approximately 3.75 ml. of permeable water and salts had been extracted from the sample through the wall of the tubing.

In a second experiment all of the above conditions were the same, except that a liquid 46 comprising a dilute saline solution was placed inside housing 12. After one hour, approximately 15 ml. of water and salt had been drawn from the sample into the dialysate liquid. The result was a four-fold improvement in concentration rate.

In a third experiment, all of the conditions were the same as in the preceding paragraph, except that a 2% (by weight) concentration of dextran, which is a macromolecular form of glucose impermeable with respect to the membrane tube, was included in the liquid 46 to further decrease water molecule activity. In one hour, under the same conditions as before, approximately 16.95 ml. was extracted from the sample into the dialysate liquid 46, for a 13% increase over the results obtained under the conditions of the preceding paragraph. The effect would be proportionally higher with higher concentrations of impermeable molecules in liquid 46.

Of course in the first of the three experiments no dialysis of the sample occurred simultaneously with concentration, and the concentration of salt in the sample remained unchanged. Therefore the sample would have to undergo further processing, if dialysis were desired. Conversely, the sample drawn from the tube under the conditions of either of the latter two experiments had already been dialyzed as well as concentrated, and therefore would be ready for immediate use without the expenditure of additional time for dialysis.

The terms and expression which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A device for concentrating a sample of macromolecules comprising:
   (a) a housing for holding a liquid, said housing having a top and bottom;
   (b) container means inside of said housing sealed from the interior of said housing for immersing said sample in said liquid while maintaining it separate therefrom, said container means comprising a semipermeable membrane;
   (c) sealing means for sealing the interior of said housing from atmospheric pressure so as to permit said housing to be maintained at subatmospheric pressure;
   (d) said sealing means including a pair of vacuum-tight valves located at the top of said housing, each communicating between the exterior and interior of said housing, adaptable for selectively conducting said liquid into said housing and adaptable alternatively for sealing the interior of said housing against the entry of air into said housing through said valves while the interior of said housing is maintained at subatmospheric pressure;

(e) said sealing means further including a third vacuum-tight valve located at the bottom of said housing communicating between the exterior and interior of said housing adaptable for selectively permitting said liquid to be emptied from said housing and adaptable alternatively for sealing the interior of said housing against the entry of air into said housing through said valve while the interior of said housing is maintained at subatmospheric pressure.

2. The device of claim 1, further including another vacuum-tight valve located at the bottom of said housing communicating between the exterior and interior of said housing adaptable for selectively permitting said liquid to be emptied from said housing and adaptable alternatively for sealing the interior of said housing against the entry of air into said housing while the interior of said housing is maintained at subatmospheric pressure.

3. The device of claim 1 including a reservoir sealingly coupled with one of said pair of valves located at the top of said housing, said reservoir including means for sealing the interior of said reservoir from atmospheric pressure.

4. The device of claim 1 including a primary source of vacuum sealingly coupled with one of said pair of valves located at the top of said housing.

5. The device of claim 1 wherein said container means has aperture means formed in the top thereof for exposing the interior of said container means to air at atmospheric pressure.

6. A laboratory device for concentrating a liquid sample automatically to a predetermined variable minimum volume by extracting material from said sample through a semipermeable membrane, said device comprising:
  (a) container means for holding said liquid sample while said sample is being concentrated, the wall of said container means including a semipermeable membrane mounted in a substantially vertical position so as to contact said sample held in said container;
  (b) a sample collection chamber located vertically below the bottom of said membrane and detachably coupled with the interior of said container means at a position below said membrane for holding a lower portion of said sample while said sample is being concentrated; and
  (c) adjustable means for varying the internal volume of said sample collection chamber and thereby varying the volume of said lower portion of said sample held below said membrane, whereby the level of said sample falls below the bottom of said vertical membrane before said sample is concentrated to a volume less than the volume of said collection chamber, thereby automatically preventing concentration of said sample to said lesser volume.

7. The device of claim 6 including means defining a port positioned vertically below the bottom of said membrane and communicating between the interior and exterior of said container means, said port comprising an aperture tapered so as to make it adaptable for sealingly engaging the tip of a syringe and thereby coupling said syringe with said container means.

8. The device of claim 7 wherein said port is vertically oriented, said tapered portion for engaging the tip of said syringe comprising a lower portion of said port having a gradually increasing cross-section in a downward direction, said port also including an upper tapered portion having a gradually increasing cross-section in an upward direction.

9. The device of claim 7 wherein said container means comprises a vertically oriented elongate tube of semipermeable membrane materials sealingly fastened to the perimeter of said means defining said port.

10. A method of concentrating a liquid sample automatically to a predetermined variable minimum volume by extracting material from said sample through a semipermeable membrane, said method comprising:
  (a) holding an upper portion of said sample in contact with said semipermeable membrane while holding a lower portion of said sample at a level below the bottom of said membrane;
  (b) preadjusting the volume of said sample portion held below said membrane by variably adjusting the internal volume of the portion of the sample holder situated below said membrane;
  (c) thereafter extracting material from said sample through said semipermeable membrane until the level of said sample falls below the bottom of said membrane.

References Cited
UNITED STATES PATENTS

| | | | |
|---|---|---|---|
| 2,715,097 | 8/1955 | Guariho | 210—321 |
| 3,130,156 | 4/1964 | Neff | 210—22 X |
| 3,483,867 | 12/1969 | Markovitz | 210—321 X |
| 3,148,141 | 9/1964 | Schonenberger et al. | 210—22 |
| 3,366,246 | 1/1968 | Goldsmith | 210—436 |
| 3,012,863 | 12/1961 | Feichtmeir | 23—259 X |
| 3,459,176 | 8/1969 | Leonard | 210—321 X |
| 3,626,751 | 12/1971 | Overbeck et al. | 23—259 X |
| 3,525,592 | 8/1970 | Buckley | 23—259 X |
| 3,228,877 | 1/1966 | Mahon | 210—22 |
| 2,864,506 | 12/1958 | Hiskey | 210—22 X |
| 3,562,152 | 2/1971 | Davison | 210—321 X |
| 3,591,493 | 7/1971 | Zeineh | 210—321 X |

FRANK A. SPEAR, JR., Primary Examiner

U.S. Cl. X.R.

210—321

UNITED STATES PATENT OFFICE
CERTIFICATE OF CORRECTION

Patent No. 3,783,127          Dated January 1, 1974

Inventor(s) Melvin W. Cook and Donald E. Begley

It is certified that error appears in the above-identified patent and that said Letters Patent are hereby corrected as shown below:

| | | |
|---|---|---|
| Col. 2, | Line 41 | After "dialysis" insert --is--; |
| | Line 50 | Change "perfoorm" to --perform--; |
| | Line 63 | Change "tube" to --tubes--. |
| Col. 3, | Line 4 | After "and" insert --the--; |
| | Line 4 | Delete the comma after the word "membrane". |
| Col. 4, | Line 53 | Change "with" to --within--. |
| Col. 5, | Line 23 | Change "othe" to --the--. |
| Col. 7, | Line 18 | Change "sample 33. Due to this initial imbalance, the solute" to --sample 33 having certain permeable salts dissolved--; |
| | Line 27 | Change "soluble" to --solute--; |
| | Line 29 | Change "same" to --sample--; |
| | Line 35 | Change "same" to --sample--. |
| Col. 8, | Line 10 | Change "atmosphere" to --atmospheres--. |

Signed and sealed this 9th day of July 1974.

(SEAL)
Attest:

McCOY M. GIBSON, JR.
Attesting Officer

C. MARSHALL DANN
Commissioner of Patents